(12) United States Patent
Graumann et al.

(10) Patent No.: US 7,046,795 B2
(45) Date of Patent: May 16, 2006

(54) METHOD AND APPARATUS FOR ACTIVE LATENCY CHARACTERIZATION

(75) Inventors: David L. Graumann, Beaverton, OR (US); Thomas J. Barnes, Beaverton, OR (US); John J. Bielaszewski, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 09/747,709

(22) Filed: Dec. 20, 2000

(65) Prior Publication Data

US 2001/0016783 A1 Aug. 23, 2001

Related U.S. Application Data

(63) Continuation of application No. 08/822,381, filed on Jun. 25, 1997.

(51) Int. Cl.
*H04M 9/08* (2006.01)

(52) U.S. Cl. .......................... 379/406.06; 379/406.01; 379/388.02; 370/286

(58) Field of Classification Search .......... 379/406.01, 379/388.01, 388.7, 390.02; 370/286
See application file for complete search history.

(56) References Cited

U.S. PATENT DOCUMENTS

| | | | | |
|---|---|---|---|---|
| 3,721,777 A | * | 3/1973 | Thomas | 379/406.08 |
| 4,970,715 A | * | 11/1990 | McMahan | 370/287 |
| 5,007,046 A | * | 4/1991 | Erving et al. | 370/249 |
| 5,410,595 A | * | 4/1995 | Park et al. | 379/406.08 |
| 5,502,717 A | * | 3/1996 | Park | 370/286 |
| 5,737,410 A | * | 4/1998 | Vahatalo et al. | 370/286 |
| 5,761,638 A | * | 6/1998 | Knittle et al. | 704/233 |
| 5,890,104 A | * | 3/1999 | Hollier | 704/201 |
| 5,896,452 A | * | 4/1999 | Yip et al. | 379/406.01 |
| 6,418,203 B1 | * | 7/2002 | Marcie | 379/90.01 |

* cited by examiner

*Primary Examiner*—Brian T. Pendleton
(74) *Attorney, Agent, or Firm*—Robert A. Greenberg

(57) ABSTRACT

Briefly, in accordance with one embodiment of the invention, a method for actively characterizing the latency of an audio channel of a computer, such as a personal computer, is provided. At least two signal streams for a waveform are created in the audio channel. The presence of the first signal sample stream for the waveform and the second signal sample stream for the waveform is detected at a point in the audio channel. The time between the detections of the signal sample streams is measured.

Briefly, in accordance with another embodiment of the invention, a method of actively characterizing the latency of an audio channel of a computer, such as a personal computer, is provided. At least a first and a second waveform are created in the audio channel. The presence of the first and the second waveform are detected at a point in the audio channel. The time between the detections of the waveforms is measured.

3 Claims, 7 Drawing Sheets

METHOD AND APPARATUS FOR ACTIVE LATENCY CHARACTERIZATION

This application is a continuation of application Ser. No. 08/822,381, filed Jun. 15, 1997.

BACKGROUND OF THE INVENTION

1. Field of the Invention

The present invention relates to characterizing the latency of an audio channel and, more particularly, to actively characterizing the latency of an audio channel.

2. Background Information

A copy of a signal sample stream that has been applied (after digital-to-analog conversion) to a loudspeaker is sometimes employed as a reference channel for various processing techniques in situations where a microphone receives the audio output signal of the loudspeaker. For example, in a communications system, if locally the microphone and loudspeaker operate at the same time and the far end of the communications system operates in a similar manner, a positive feedback loop may result without additional processing. It is commonly desired that, for such additional processing techniques, the reference channel signal sample stream be correlated in time with the signal sample stream produced by the microphone on a sample-by-sample basis. Processing techniques, such as acoustic echo cancellation (AEC), for example, fall into this category. For these processing techniques, ultimately, the signal samples produced by the microphone (after analog-to-digital conversion) should be paired with signal samples in the reference channel corresponding to the audio output signal being produced by the loudspeaker.

Personal computers are more frequently being employed in communications applications. For example, a personal computer may be employed in audio conferencing because state-of-the-art personal computers frequently come equipped with a microphone, loudspeakers, or alternatively, these devices may be added to a personal computer relatively easily. For example, the availability of computer add-in cards, such as a soundcard or a card that permits the personal computer to successfully interface with an Integrated Services Digital Network (ISDN) line or Plain Old Telephone Service (POTS) line, allows the personal computer to be employed in this fashion. For personal computers employed in this way, it is desirable to enable full duplex audio operation. Where acoustic coupling exists between a microphone and a speaker that are also coupled to a communications medium, acoustic echo cancellation techniques are typically employed.

To accomplish acoustic echo cancellation on a personal computer, for example, the previously described time correlation is performed. Unfortunately, techniques to perform this time correlation for a personal computer usually involve using detailed knowledge regarding aspects of the personal computer hardware and software employed. A reason this occurs is because specific aspects of the hardware and/or software may affect signal latency. For example, a signal or stream of signal samples produced in an audio channel before or ahead of a speaker in the channel may later be reproduced in the audio channel after a microphone. Therefore, the hardware and/or software may play a part in performing the previously described time correlation. For example, in one approach, the signal samples for the input stream and the output stream are paired in the low level software that controls the physical layer of the digital-to-analog converter. See U.S. Pat. No. 5,495,473, titled "Methods and Apparatus For Implementing Hardware Independent Echo Cancellation In A Full-Duplex Audio Stream in a Computer System", by Daniel R. Cox, issued Feb. 27, 1996, assigned to the assignee of the current invention and herein incorporated by reference. Other hardware or software specific approaches may, likewise, be employed.

To avoid this low-level correlation control, a technique or approach is needed to provide this time correlation independent of the underlying hardware and software for a computer, such as a personal computer.

SUMMARY OF THE INVENTION

Briefly, in accordance with one embodiment of the invention, a method for actively characterizing the latency of an audio channel of a computer, such as a personal computer, is provided. At least two signal streams for a waveform are created in the audio channel. The presence of the first signal sample stream for the waveform and the second signal sample stream for the waveform is detected at a point, such as a predetermined point, in the audio channel. The time between the detections of the signal sample streams is measured.

Briefly, in accordance with another embodiment of the invention, a method of actively characterizing the latency of an audio channel of a computer, such as a personal computer, is provided. At least a first and a second waveform are created in the audio channel. The presence of the first and the second waveform are detected at a point, such as a predetermined point, in the audio channel. The time between the detections of the waveforms is measured.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed description which follow are presented in terms of algorithms and symbolic representations of operations on data bits or binary digital signals within a computer memory. These algorithmic descriptions and representations are the means used by those skilled in the signal processing arts to convey the substance of their work to others skilled in the art. An algorithm is here, and generally, considered to be a self-consistent sequence of steps leading to a desired result. The steps are those employing physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise, as apparent from the following discussions, it is appreciated that throughout the specification, discussions utilizing terms such as "processing" or "computing" or "calculating" or "determining" or the like, refer to the action and processes of a computer system, or similar electronic computing device, that manipulate and transform physical (electronic) quantities within the computing system's registers and/or memories into other physical quantities within the computing system's memories, registers or other such information storage, transmission or display devices.

Figure 4:
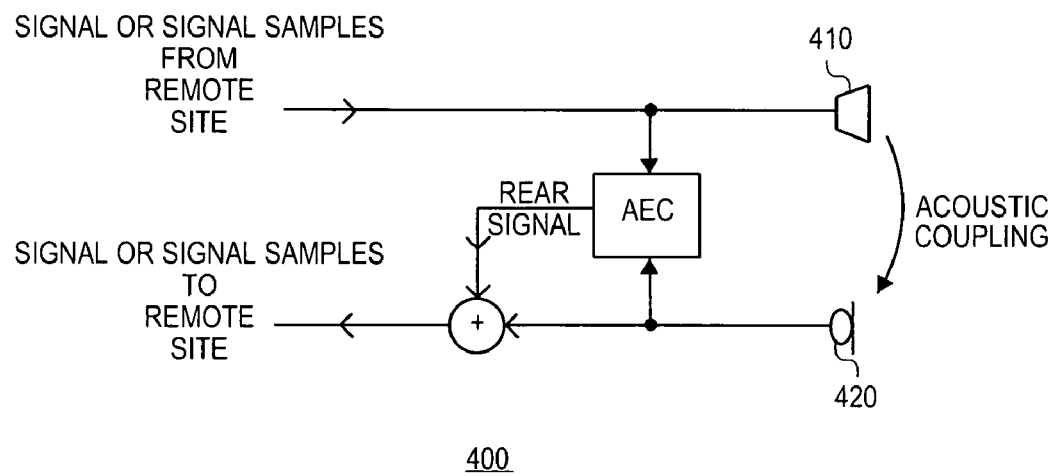
FIG. 4 is a schematic diagram illustrating the operation of a conventional speakerphone.

FIG. 4 is a schematic diagram illustrating the operation of a conventional speakerphone. As illustrated in FIG. 4, embodiment 400 receives signals from a remote site and these signals, when applied to speaker 410, result in acoustic output signals. Likewise, microphone 420 receives acoustic signals as input signals, and these acoustic input signals are transmitted to the remote site. For speakerphone 400 to operate in a full duplex mode, meaning in this context, that it includes the capability to both send and receive acoustic signals at the same time, the speakerphone should employ a technique for attenuating or at least partially offsetting the acoustic coupling between speaker 410 and microphone 420. Conventionally, these techniques are referred to as acoustic echo "cancellation", although perfect cancellation may not necessarily be attained. In acoustic echo cancellation, the speakerphone determines the signals originating from speaker 410 that are received by microphone 420 and attempts to attenuate or at least partially offset these acoustically coupled signals. Otherwise, a feedback loop between the remote and local site may result during full duplex operation of the speakerphone that would be undesirable.

One aspect of acoustic echo cancellation (AEC) relates to the timing relationship between acoustic signals produced by an acoustic signal output device, such as speaker 410, and acoustic input signals received by an acoustic signal input device, such as microphone 420. It is desirable for the AEC technique to correlate in time audio signals or signal samples produced by the speaker with audio signals or signal samples received by the microphone. Furthermore, it is desirable to have those signal samples correlated to within a few milliseconds. One reason this is desirable in this context is because, typically, acoustic echo cancellation signal processing is implemented in the form of a digital filter of finite length. Therefore, the greater the number of taps for the filter, the more memory and processing time that is employed. Limiting the number of filter taps reduces the amount of memory employed. Thus, because the amount of memory is limited, the AEC processing may only correlate signal samples between the speaker and the microphone occurring within a specified, limited time window.

Typical, AEC techniques employ a reference channel. The reference channel provides a copy of the signal samples applied to the loudspeaker, although the signal samples applied are first converted to an analog signal. The signal samples are typically copied prior to this conversion. For echo cancellation to occur, it is desirable to ensure that within a time window, such as on the order of 200 milliseconds, the loudspeaker produces an audio output signal from the signal samples received by the microphone. A complicating factor with establishing this time correlation within these relatively tight time restraints is that, in a personal computer, for example, the AEC techniques are typically implemented using a software module or modules; however, this (these) module(s) does (do) not necessarily reside at the interface between the hardware and the software. Therefore, data buffering and other hardware/software interface issues may make it difficult to accurately and precisely establish the desired time correlation.

As previously indicated, techniques do exist to address the problem; however, such techniques typically involve detailed knowledge regarding the hardware and/or software of the system. See U.S. Pat. No. 5,495,473, "Method and Apparatus For Implementing Hardware Independent Echo Cancellation In A Full-Duplex Audio Stream in a Computer System", by Daniel R. Cox, issued Feb. 27, 1996, assigned to the assignee of the present invention and herein incorporated by reference. As previously indicated, it would be desirable if a technique existed to characterize this latency between the speaker and the microphone that is independent of the computer hardware and software.

Figure 3:
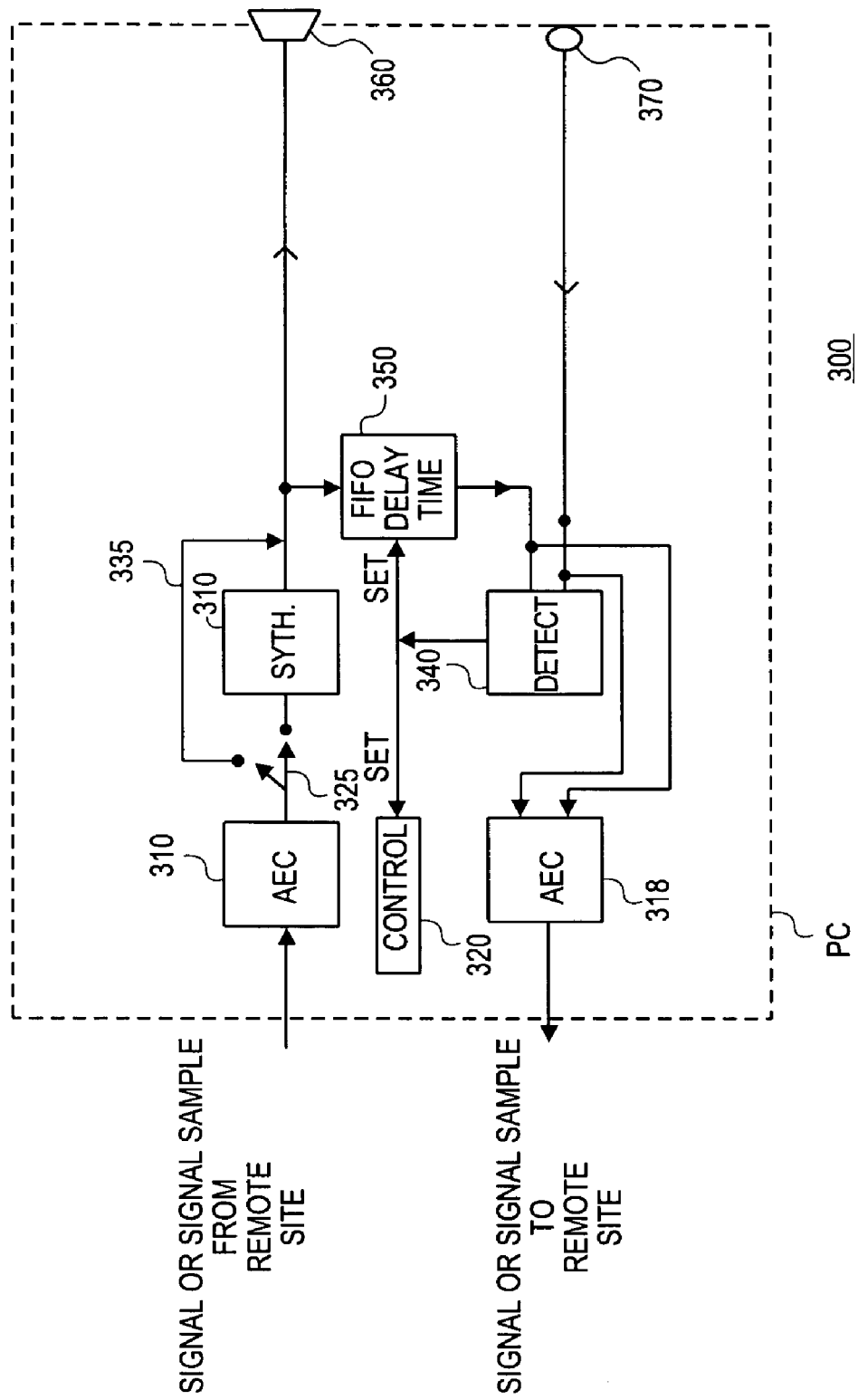
FIG. 3 is a block diagram illustrating an embodiment of an audio channel for a personal computer in which an embodiment of a method and apparatus for active latency characterization in accordance with the present invention is employed.

FIG. 3 is block diagram illustrating an embodiment of an apparatus for active latency characterization (ALC) in accordance with the present invention. As will be more clear later, in this context, the term "active" refers to the production or creation of a waveform employed to characterize the system latency. As shown in FIG. 3, embodiment 300 is illustrated as implemented on a personal computer (PC), although the invention is not limited in scope in this respect. As illustrated in FIG. 3, embodiment 300 includes a speaker 360 and a microphone 370. Likewise, this embodiment includes an acoustic echo canceller 310, a synthesizer 330, and a detector 340. Typically, these are implemented in software, although the invention is not limited in scope in this respect. As further illustrated in FIG. 3, signals are received from a remote site. In this particular embodiment, these signals comprise telephony signals. It will, of course, be appreciated that the remote site and/or the peripheral devices being characterized may be coupled to the PC by a variety of communications medium, including a wireless or a wireline media, for example. During this initial period, the acoustic echo canceller (AEC) operates in a half-duplex mode. As illustrated, after being provided to acoustic echo canceller 310, signal samples are either provided along a path including synthesizer 330 and/or along path 335. For the vast majority of the time, a switch 325 is selectively coupled so that the signal samples are provided along path 335. However, when it is desirable to create a predetermined waveform in the audio channel before or ahead of the audio signal output device, switch 325 is coupled to provide the signal samples along the path including synthesizer 330. This results in the creation of a predetermined waveform. The waveform created has a predetermined structure or signal signature to activate the audio signal output device to produce an audio output signal. Typically, the synthesizer is active for a relatively short period of time, such as on the order of 40 milliseconds. As will be discussed in more detail later, a relatively short waveform is desirable for a variety of reasons. It will, likewise, be appreciated that although switch 325 is illustrated in FIG. 3 as alternatively coupling to path 335 or to synthesizer 330, this operation may also be implemented in software. Likewise, as previously indicated, the acoustic echo canceller, synthesizer, detector, delay and control operations illustrated in FIG. 3 may all be implemented in software that operates or executes on a computer, such as a personal computer, although the invention is not limited in scope in this respect.

As a result of the operation of synthesizer 330, a waveform is produced in the form of binary digital signal samples or bits referred to here as a first signal sample stream for the waveform and provided to both speaker 360 and along the path including time delay 350 to detector 340. During this period, time delay 350 implements a delay of zero so that the signal samples traveling along this path do not experience any additional delays other than the delays associated with processing the signal samples produced. Once the signal samples for the waveform provided along this path reach detector 340, detector 340 begins to count or measure the number of signal samples received after it detects this first signal sample stream. In addition to the path of the first stream of signal samples to detector 340, as previously described, a second stream of signal samples for the waveform are also provided along a path to speaker 360. For this second stream, after digital-to-analog conversion, the analog signal produced is applied to speaker 360 and an audio output signal is produced. The speaker is acoustically coupled to the microphone. Therefore, an audio input signal corresponding to the audio output signal is applied to microphone 370. An acoustically coupled version of the audio output signal is then provided along a path from microphone 370 to detector 340. The second path, as illustrated in FIG. 3, is parallel to the path including delay 350. In this context, the term "parallel" refers to the characteristic that those two paths do not intersect between the locations at which they begin and end. Detector 340, in this particular embodiment, counts or measures the number of signal samples received between the two detectors. It is, of course, appreciated that in an alternative embodiment the second signal stream may be detected first.

As previously described, detector 340 measures the latency or time delay between the two streams of signal samples as measured, in this particular embodiment, on a sample-by-sample basis, although the invention is not limited in scope in this respect. Once detector 340 has a measurement of latency, it calibrates delay 350 with at least approximately that latency and sets the acoustic echo canceller to full duplex operation. Thus, due to the setting of delay 350, the two paths to detector 340 are now time correlated. Therefore, detector 340 may be removed from the loop, and signal samples may be provided to AEC 310, as illustrated in FIG. 3.

Figure 1:
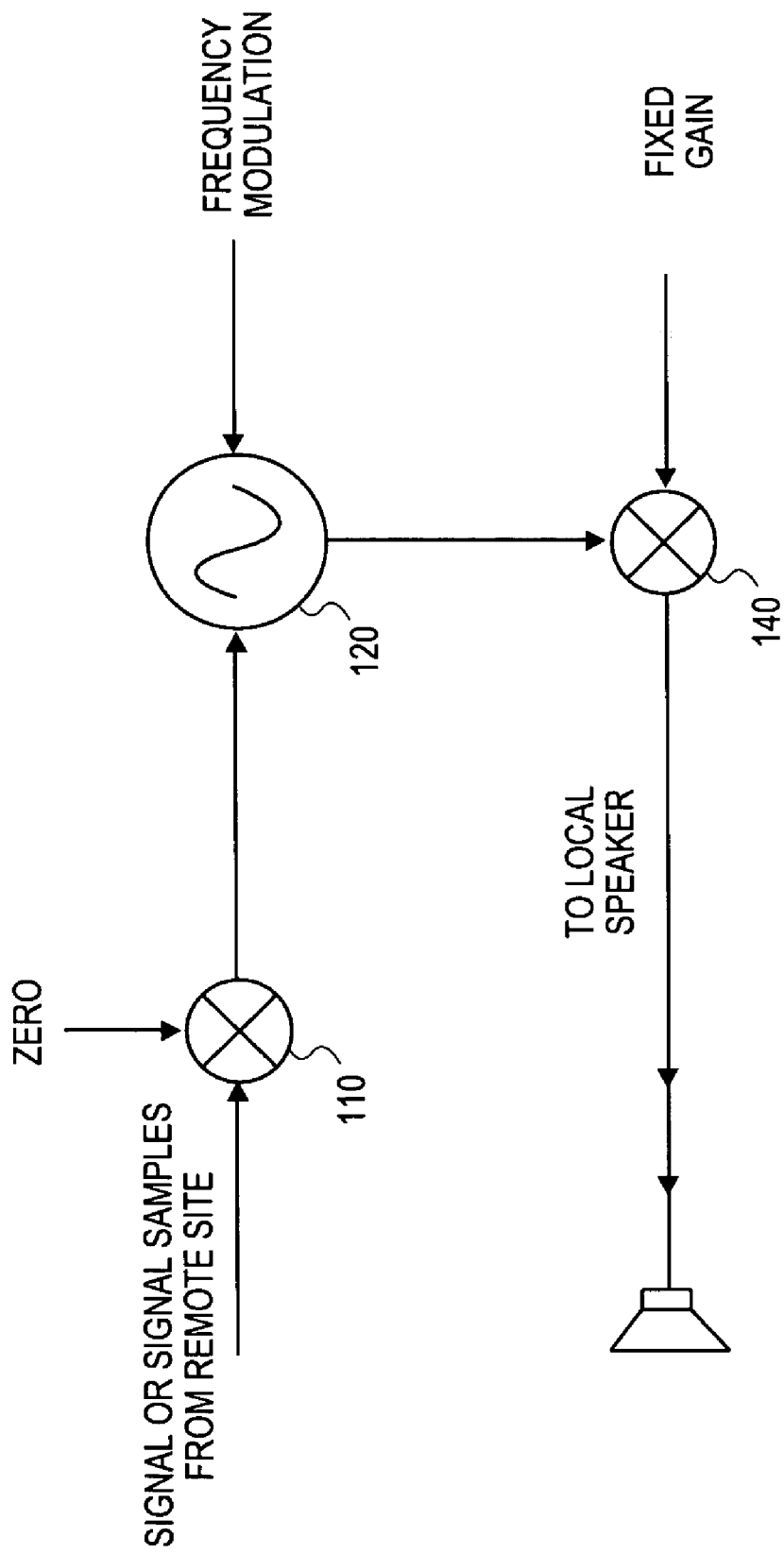
FIG. 1 is a schematic diagram illustrating an embodiment of an active latency characterization synthesizer in accordance with the present invention.
Figure 2:
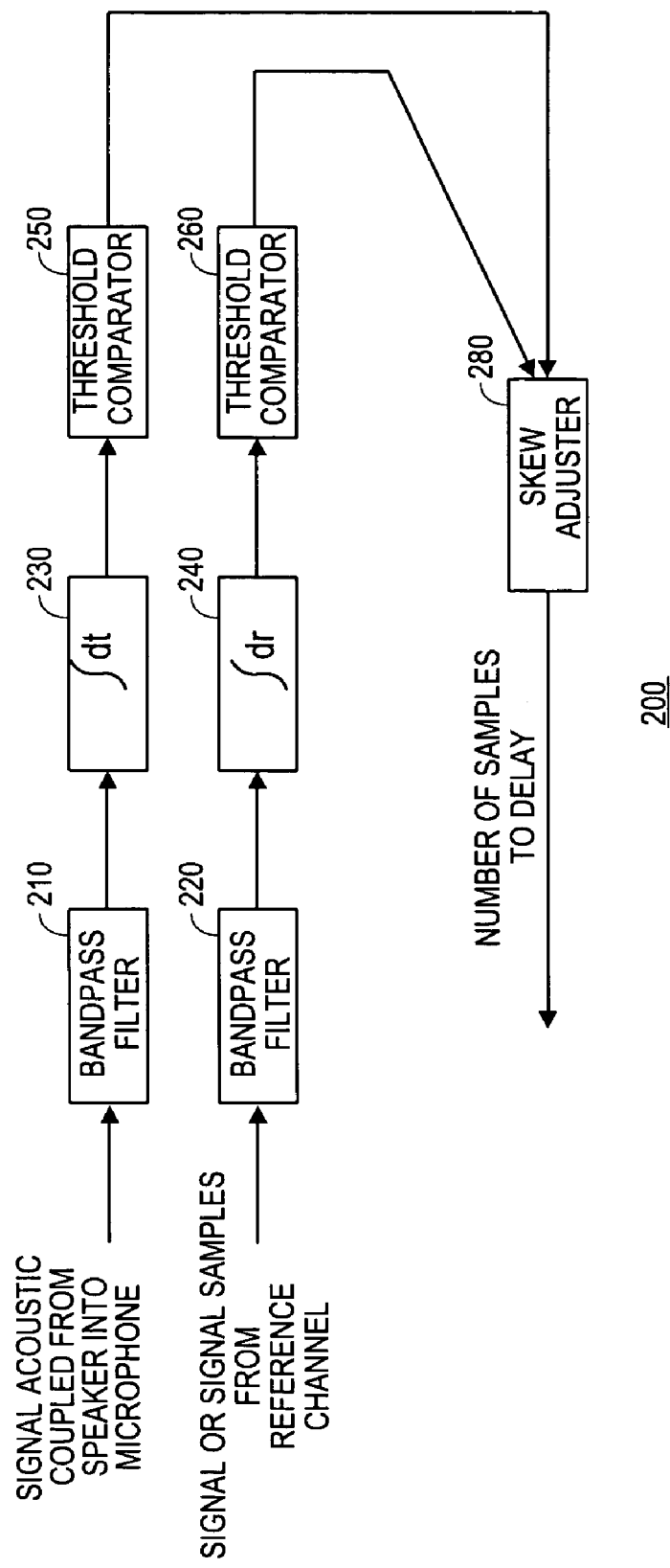
FIG. 2 is a schematic diagram illustrating an embodiment of an active latency characterization detector in accordance with the present invention.

FIG. 1 is a schematic diagram illustrating an embodiment of a synthesizer for an apparatus for active latency characterization is accordance with the present invention. It will, of course, be appreciated that the invention is not limited in scope to this particular embodiment. To create a predetermined waveform in the audio channel, signals received from the remote site are "zeroed" in this embodiment, such as illustrated in FIG. 2, by multiplier 110. It will, of course, be appreciated that the predetermined waveform may be superpositioned with the signals received from the remote site in an alternative embodiment. However, in this embodiment it is considered desirable to zero the signals received from the remote site instead of superpositioning them with the waveform to reduce the possibility of corruption of the predetermined waveform due to noise, such as speech, for example. Of course, alternative approaches to zero the received signals may also be employed. Here, the duration of the waveform is also kept sufficiently short so that substantially no speech transmitted from the remote site is rendered unintelligible. One disadvantage of this approach is the risk, albeit small, that a false alarm may occur at the detector due to the signal samples produced from the speech transmitted from the remote site that ultimately arrives at the detector. Alternatively, the speakerphone could perform the active latency characterization without allowing speech to be transmitted until the characterization is complete, although this may delay a call and would, therefore, have some disadvantages.

Next, as illustrated in FIG. 1, in this particular embodiment a sine wave is frequency modulated. Again, it will be appreciated that the invention is not limited in scope to modulating a sine wave. In this particular embodiment, the frequency of the sine wave is frequency modulated linearly to produce a "chirp," such as in accordance with the following equation:

$$W(t) = \text{rect}\left(\frac{t}{T}\right)\exp\left[i\,2\pi\left(f_o t + \frac{k}{2}t^2\right)\right] \quad \text{where} \quad [1]$$

$$\text{rect}\left(\frac{t}{T}\right) = \begin{cases} 1, & -T/2 \leq t \leq T/2 \\ 0, & \text{otherwise} \end{cases} \quad [2]$$

and T is the signal period, t is time, W(t) is the waveform, $f_o$ is the center frequency, and k=B/T, where B is the bandwidth, and k is the slope of the instantaneous frequency. See, for example, *Signals, Noise, and Active Sensors*, by John Minkoff, available from John Wiley & Sons, Inc., (1992), herein incorporated by reference. Alternatively, other waveforms may be employed. For example, a sine wave whose frequency has not been modulated, may be employed, although, one disadvantage of a pure sine wave is the difficulty of identifying the beginning and end of the waveform. Alternatively, a pseudo-random sequence may be employed. Such sequences are relatively easy to produce computationally, however, they are susceptible to corruption from background noise, such as may occur during audio signal propagation through the atmosphere between the speaker and the microphone.

Although the invention is not limited in scope in this respect, for this particular embodiment, sine wave modulation is implemented using a table of sine wave binary digital signal samples for a one Hertz sine wave. To produce the desired frequency modulation, the personal computer operates to step through the sine wave table at varying speeds. Likewise, although not illustrated in FIG. 1, interpolation is employed in a floating point format between sine wave table signal values to provide greater precision.

One aspect of this particular embodiment in accordance with the present invention relates to the particular range of frequencies over which modulation is performed. Typically, because a significant portion of the audio speech signal energy exists at relatively low frequencies, to reduce the possibility of corruption, modulation is initiated at a frequency of around 1 kilohertz. Likewise, modulation typically does not exceed a frequency up to around 3 or 4 kilohertz. Audio signals are being communicated, and, therefore, frequencies above this range may be attenuated or filtered by the communications system, such as by the speakers, microphone, or communications channel, for example. As illustrated in FIG. 1, after modulation and interpolation, resulting values of the sine wave are then multiplied by a fixed gain, such as on the order of $2^{10}$ and these values are provided to a digital-to-analog converter, such as may exist in a soundcard. The resulting analog signal is then applied to the local speaker.

FIG. 2 is a schematic diagram illustrating an embodiment of a detector for an apparatus for active latency characterization in accordance with the present invention. It will, of course, be appreciated that the invention is not limited in scope to this particular embodiment. As illustrated in FIG. 2, two parallel paths employing substantially the same processing are used, one for the reference channel, and the other for the local channel. In this context, the local channel refers to the path of the signals or signal samples that includes acoustic coupling between the audio signal output device and the audio signal input device. Likewise, the reference channel refers to the path of replicated signals or signal samples to be provided to the acoustic echo canceller through an adjustable time delay, such as delay 350 in FIG. 3. As previously discussed, in this particular embodiment in accordance with the present invention, a predetermined waveform is created in the audio channel. Thus, referring now to the embodiment illustrated in FIG. 3, a second stream of signal samples and first stream of signal samples for this waveform are respectively provided along the path between speaker 360 and microphone 370 (local channel) in which acoustic coupling between these two devices occurs and, likewise, along the path including delay 350 (reference channel). It will be understood that the terms "first" and "second" do not imply any temporal relationship between the signal sample streams.

As FIG. 2 illustrates, in this embodiment both paths include a filter, an integrator, and a threshold comparator, although the invention is not limited in scope in this respect. One reason substantially the same processing is employed along both paths is so that when comparing the time between detections for signal sample streams traveling along each respective path, the time associated with processing the signal samples along the respective paths does not affect the latency determination. The signal processing employed in this particular embodiment implements a matched filter for the predetermined waveform and thresholding trigger.

In this particular embodiment, skew adjuster 280 detects a "spike" waveform based on the output signal samples of the matched filter and once it detects the desired spike, signal samples received after the spike are counted. Of course, signal samples may be counted before detection of a spike as well, such as to determine if too much time passes without detection. In one embodiment, skew adjuster 280 eventually also detects a spike waveform for the signal samples associated with the audio signal that traveled along the path between speaker 360 and microphone 370. Skew adjuster 280, therefore, counts the number of signal samples received between these two detections and this provides an indication of the number of signal samples to delay the reference channel signal samples for the desired time correlation to occur between the reference channel and the local channel. Of course, it may be desirable to set delay 350 so that the reference channel signal samples arrive slightly ahead of the local channel signal samples. Acoustic echo canceller 310 may then employ the signal samples from the reference channel to perform its echo cancellation operation. For example, although the invention is not limited in scope in this respect, a reference channel adjustment of a few milliseconds ahead may be desirable.

One aspect of the embodiment previously described in accordance with the invention relates to maintaining a real-time relationship between the two signal sample streams previously discussed. Essentially, the signal processing previously described establishes a real-time relationship between the two streams. Therefore, it is desirable that this real-time relationship be preserved for the previously described embodiment to operate properly. Therefore, if that real-time relationship is disturbed in some manner, it may be desirable to recharacterize the real-time relationship. For example, if a new phone call is initiated or if the telephone network or computer goes down, then recalibration may be desirable.

As previously discussed, another aspect of the previously described embodiment in accordance with the invention relates to the signature of the predetermined waveform. As previously discussed, it is desirable to employ a waveform in which the signature is sufficiently distinctive at the beginning or start of the waveform and at the end or the point in time where the waveform stops. Likewise, it is desirable to employ a waveform having a signature that is relatively resilient to corruption, such as from background noise or speech, for example. A variety of trade-offs are, therefore, employed in selecting the predetermined waveform. For example, a pseudo-random waveform may be employed and has the advantage of relative ease of production computationally; however, such a waveform is more susceptible to corruption than some alternative waveforms. Likewise, a sine wave may be relatively easy to produce, however, due to its signal structure, resolving the beginning and end of the waveform may be more difficult than some alternatives. These and other waveforms are, nonetheless, suitable and may be employed in an embodiment in accordance with the invention. More complex waveforms may be desirable also.

Several aspects of an embodiment of a method and apparatus for active latency characterization in accordance with the present invention relates to system control considerations. For example, although the invention is not limited in scope in this respect, it may be desirable to activate the synthesizer after activating the detector. Such an approach would reduce the risk of failing to observe a detection because the detector is not activated when the signal samples arrive. Likewise, it may be desirable to reinitiate the synthesizer, if, after a predetermined period of time, the detector has failed to detect the desired signal samples. For example, a lack of detection may be an indication that an aspect of the system is not operating properly. The speaker or the microphone may not be active, for example.

As previously indicated, for the embodiment illustrated in FIG. 2, substantially the same processing is applied to the reference channel path and the local channel path. As previously indicated, one advantage of this particular embodiment is that a detector may compare in the time the detections produced for the two signal sample streams received without adjusting for the time attributable to performing the signal processing. Likewise, another advantage is that such an embodiment may be convenient to implement in software. Because substantially the same processing is employed along each path, the same or substantially the same software module(s) may be employed to implement the signal processing, thereby reducing the coding time. However, in an alternative embodiment, in accordance with the invention, substantially the same processing need not be employed along each path. Furthermore, different predetermined waveforms may be applied along each path. The reason such an approach may be employed is because, unlike the path between the speaker and the microphone, the reference channel path is not subject to the same risk of signal corruption. Therefore, in an alternative embodiment, one waveform, such as a pseudo-random waveform, for example, may be applied along the reference channel signal path, while a different waveform, such as a chirp waveform, for example, may be applied along the local channel path. Likewise, the reference channel path may omit a bandpass filter. Again, because in this embodiment the reference channel path will not be exposed to externally derived audio signals, there is no need to apply filtering.

An advantage of employing this approach is that it may reduce the processing load of the computer in comparison with the embodiment previously described. However, as previously suggested, for this embodiment, the difference in signal processing time along the two paths should be taken into account when determining the audio channel latency. Likewise, although the embodiment previously described and illustrated in FIG. 6 may reduce the processing load of the computer, nonetheless, if this particular embodiment is implemented in software, the amount of time to code such an embodiment may be greater than the previous embodiment due to the time to perform additional coding.

Employing an active latency characterization technique on a computer, such as a personal computer, involves several signal processing considerations. Some of these considerations have been discussed previously, such as ease of signal detection, for example. However, another aspect, not discussed previously, relates to multipath issues that are made more complex by personal computers that typically include two speakers. Although a multipath issue may exist even in systems employing one speaker, this issue is more complex in two speaker systems because each speaker comprises an audio signal source. One approach to address the multipath issues associated with an embodiment of a method and apparatus for active latency characterization in accordance with the present invention implemented in a computer, such as a PC, includes interleaving the signal streams normally provided to each respective speaker to thereby provide, instead, a single signal sample stream and then zeroing one of the speakers so that, although the personal computer has two speakers, only one of the two speakers produces an audio output signal. Although such an approach may be employed, the invention is not limited in scope to this approach.

In an alternate approach, the synthesizer and detector may be adjusted so that an embodiment in accordance with the present invention is at least resistant to multipath interference. As previously discussed, it is desirable to employ a predetermined waveform having a signature that is not easily corrupted by speech, such as a chirp, for example. Likewise, the predetermined waveform may be employed over a frequency range that avoids or reduces overlapping with frequencies associated with speech. One disadvantage of shortening the available frequency range is that less signal energy will ultimately be detected. To reduce the risk that a signal sample stream will therefore go undetected, the detection thresholds may be lowered to adjust for less signal energy reaching the detector after filtering. For example, a detector may indicate a detection when 50% of the signal energy, after normalization, is detected. For example, in one embodiment in accordance with the invention, a detector will identify a detection for a spike signal that is 40–50% above the background noise. One disadvantage of using these lowered detection thresholds, of course, is that it increases the risk of a false detection. One approach to offset this increased risk, while employing the techniques previously discussed, is to limit the time window that the detector employs for a signal detection. For example, although the invention is not limited in scope in this respect, for the embodiment illustrated in FIG. 2, a detector may search for a detection for no more than 1 second.

Several other aspects of a computer make this particular application unique. For example, because a computer, such as a PC, is being used for communications and because the active latency characterization is performed in real-time, it is desirable that the predetermined waveform employed not be unappealing or annoying to the human ear. Likewise, as previously indicated, the application to communications limits the frequency spectrum of the system. Furthermore, the processing employed should be capable of being implemented on a PC without overwhelming the processor or microprocessor. As previously indicated, it is also desirable to have an approach that is independent of the hardware and software of the computer. However, in an application such as this, it would not be unusual if the software executed by the computer to produce an audio signal included many layers. In this context, these software layers are referred to as an "audio stack." This audio stack may introduce significant uncertainly regarding the amount of time it will take signal samples to propagate through the system, such as in the manner previously discussed. For example, for the local channel, assume a signal originates at the far end of the communications system or the remote site. Once the signal samples have been applied to the audio channel of the computer, the samples will propagate through the multiple software layers. The samples will then propagate through the computer hardware, including the loudspeaker, until an audio signal is introduced into the ambient audio environment. This audio signal will then propagate through the atmosphere until it is received by microphone. After the audio signal is picked up by the microphone, again, the signal will propagate through the computer hardware, be converted to signal samples, and propagate through the multiple layers of software until it arrives at the acoustic echo canceller. Based on the amount of time it takes the audio signal to propagate through the atmosphere, assuming a distance of less than ten feet between the speaker and microphone, and the amount of time the signal samples take to propagate through the computer hardware based on experimentation, a significant portion of time the signal samples spend propagating through the system is spent propagating through the software layers including the audio stack.

In the previously described embodiments, a matched filter is employed to detect the presence of the predetermined waveform or a version of the predetermined waveform produced by acoustic coupling. A matched filter is employed because it provides a desirable level of resolution in time of the waveform sought to be detected. However, the invention is not limited in scope to employing a matched filter. For example, a detector may alternatively employ a bank of filters tuned to detect the presence of the predetermined waveform. Once the beginning and the end of the waveform have been detected, the location of the detected waveform may be centered in time to determine the system latency, as desired. Likewise, the detector could operate in the frequency domain, rather than the time domain as previously described.

Figure 5A:
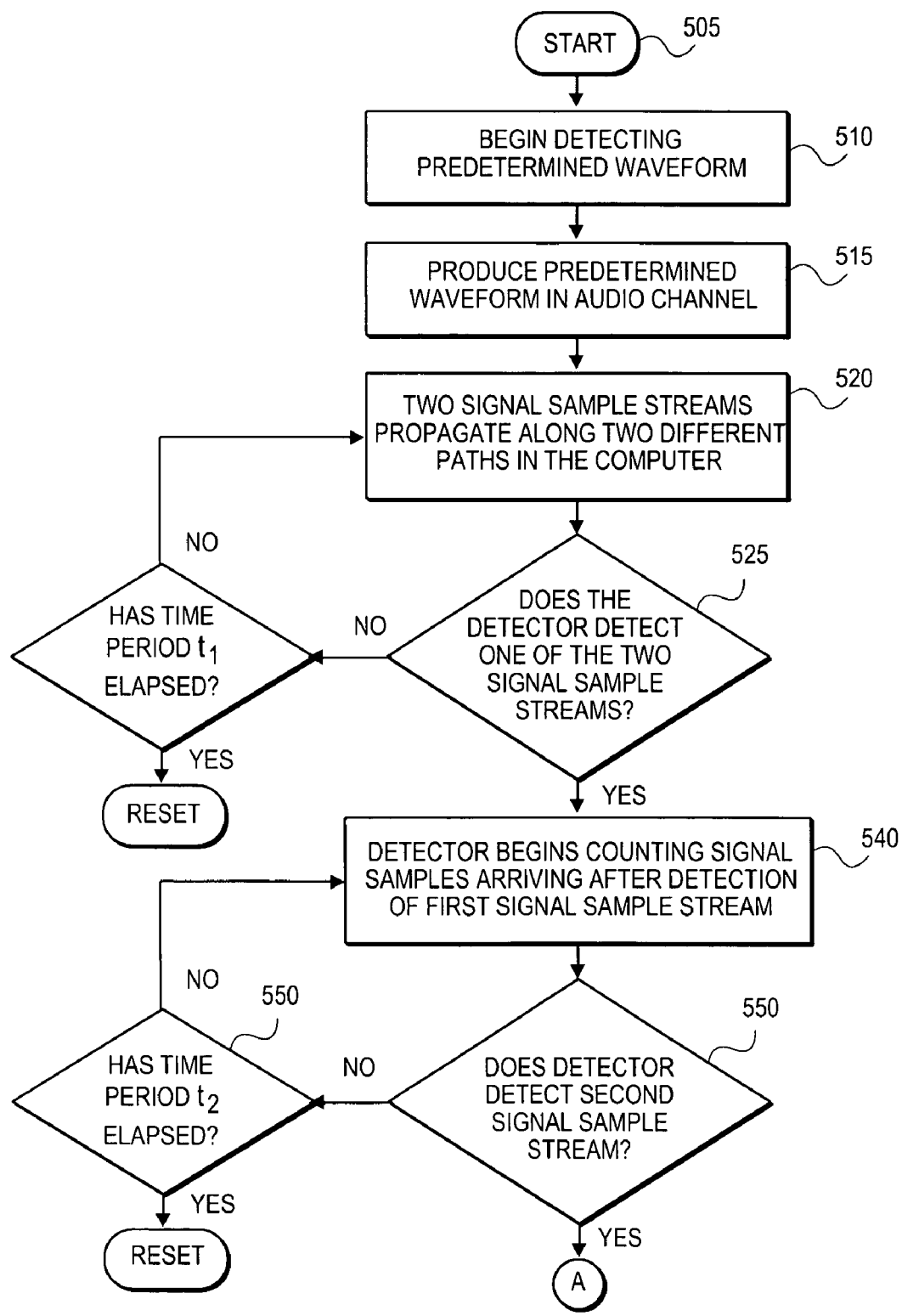
FIGS. 5A and 5B is a flowchart illustrating an embodiment of a method for active latency characterization in accordance with the invention.
Figure 5B:
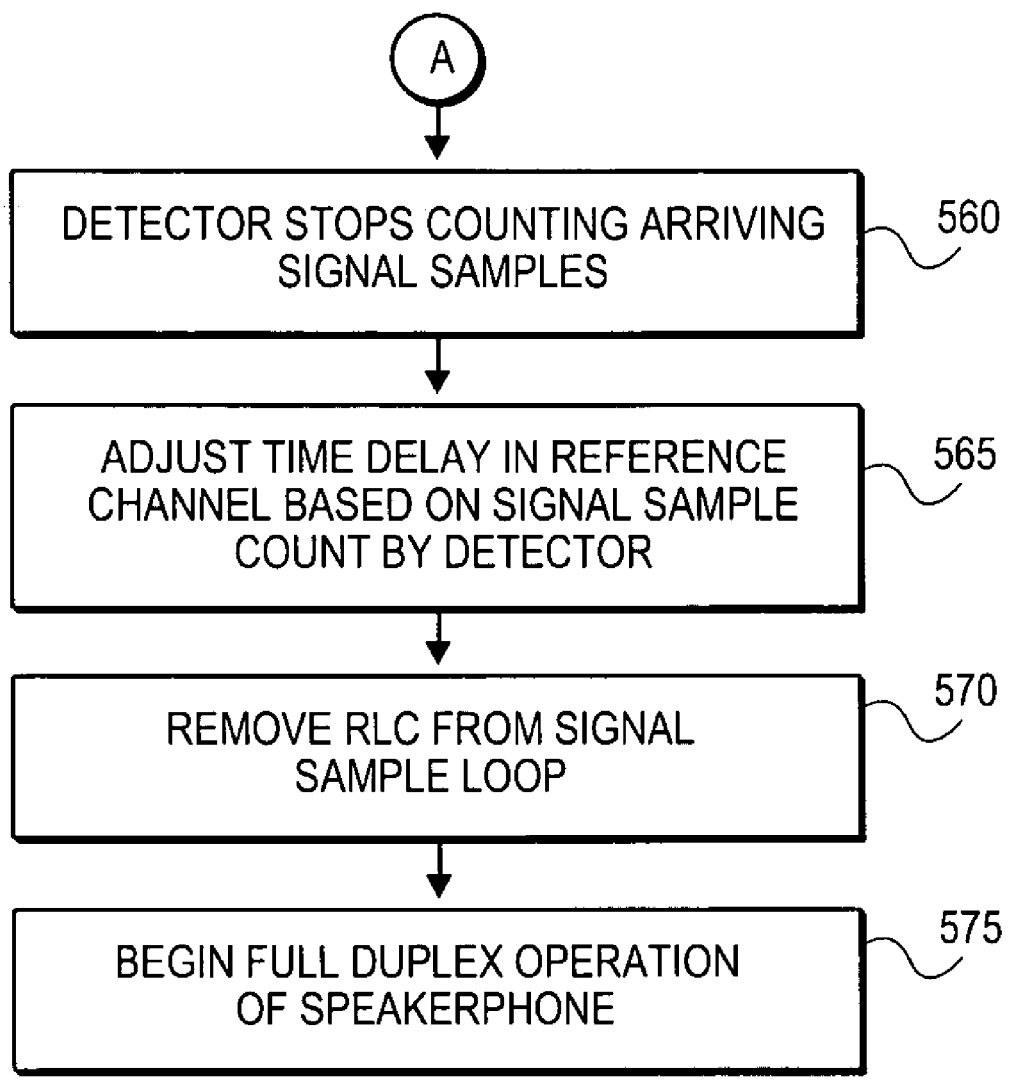

FIGS. 5A and 5B is a flowchart illustrating an embodiment of a method for active latency characterization in accordance with the invention. This embodiment may be performed, for example, by the embodiment illustrated in FIG. 3. For example, in a typical computer system including an audio channel, such as a personal computer system, a machine-readable storage medium may have stored instructions that, when executed by the computer system, result in the performance of the following embodiment. Of course, the invention is not limited in scope to this particular embodiment. As illustrated in FIG. 5A, in 510, detection is begun, such as by detector 340 in FIG. 3. In 515, a predetermined waveform is produced in the audio channel. For example, synthesizer 330 in FIG. 3 may accomplish this. As previously described, a number of different predetermined waveforms may be produced. Likewise, in an alternative embodiment, different waveforms may be produced, one for each parallel path. Of course, a signal sample stream is produced for each waveform in such an embodiment. However, for the embodiment illustrated in FIG. 5A, instead, two signal sample streams for one predetermined waveform are produced and propagated along two different paths in the computer, as illustrated in 520. As illustrated in a process loop including blocks 525, 530 and 520, the detector waits a predetermined period, such as $t_1$. If no signal sample stream is detected within that period, then the speakerphone assumes a malfunction has occurred and stops. The computer may use an internal clock to measure $t_1$, although an alternative approach may also be employed. If a signal sample stream is detected, then the detector begins counting the signal samples that arrive after this first detection, as illustrated in 540. In a second process loop including blocks 555, 550 and 540, the detector waits for a second signal sample stream to be detected. If no detection occurs within time period $t_2$, again a malfunction is assumed. If the second signal sample stream is detected within $t_2$, then the detector stops counting signal samples, as illustrated in 550. In 565, the time delay, such as illustrated in FIG. 3, is adjusted based, at least in part, on the number of signal samples counted or measured by the detector. In 570, as previously described, the detector is then removed from the signal sample loop. In 575, the speakerphone then begins full duplex operation.

Figure 6:
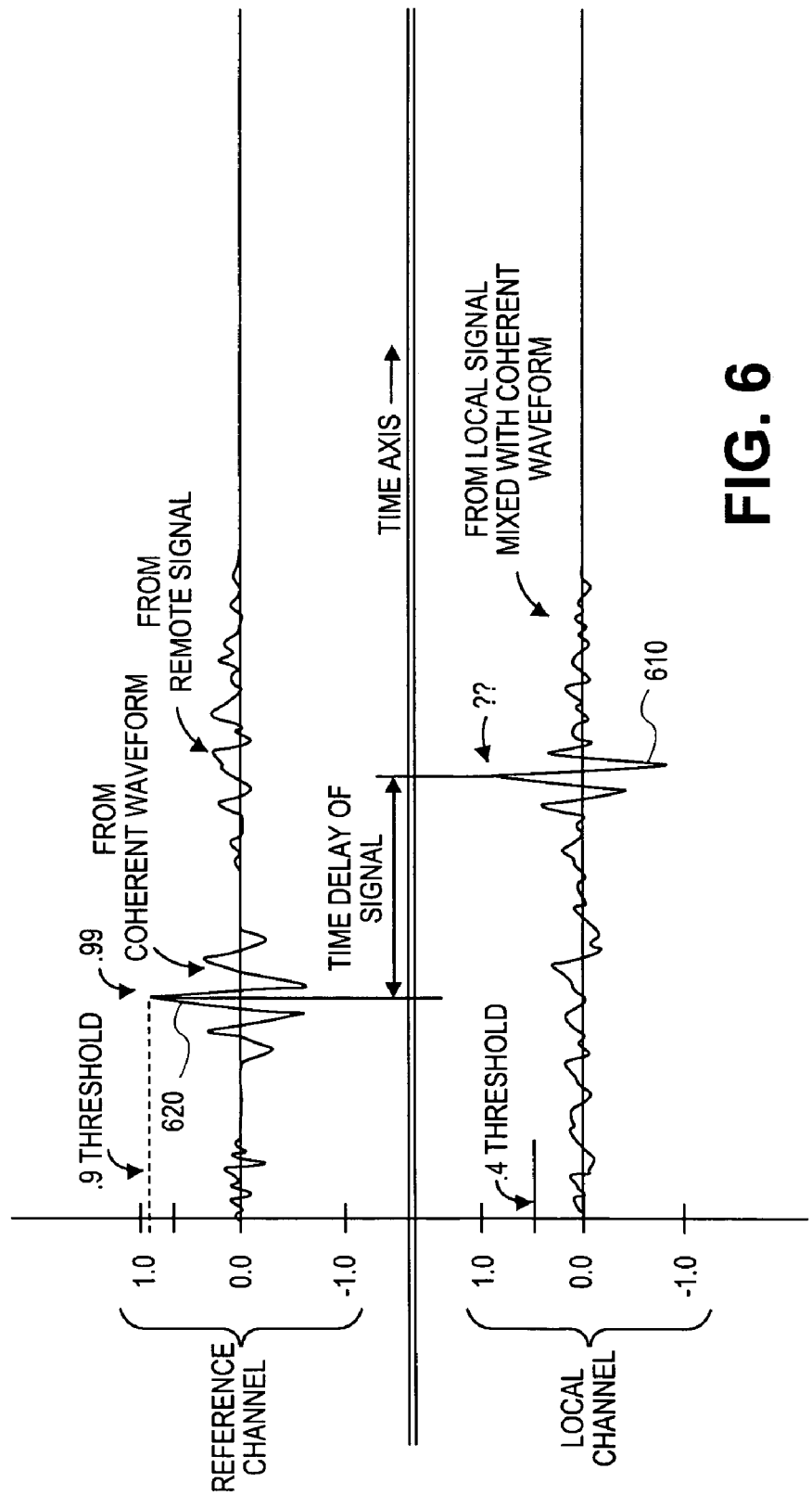
FIG. 6 is a diagram illustrating a time delay between detections of the signal sample streams by an embodiment of an active latency characterization detector in accordance with the present invention.

FIG. 6 is a diagram illustrating a time delay between detections of the signal sample streams by an embodiment of an active latency characterization detector in accordance with the present invention. FIG. 6 was not produced directly from actual results, but illustrates the type of results that an embodiment in accordance with the invention may be capable of producing. The detections in the reference channel and the local channel, respectively, are correlated in time. Curve 610 illustrates the results for the local channel in which a 0.4 threshold is employed, although alternative thresholds may also be used. Due to the path for the local channel for this embodiment, the results shown illustrate the effects of mixing the coherent waveform created with the local signal introduced between the speaker and the microphone. Likewise, for the reference channel, a 0.9 threshold is employed for this embodiment for reasons previously discussed. However, as previously described, in this embodiment the waveform is introduced in the audio channel along a path that includes the remote signal originating from the far end of the communications channel. Curve 620 illustrates the results this may produce. The time delay between the detections illustrated provides a measure of latency, as previously described.

While certain features of the invention have been illustrated as described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A system comprising:
a waveform synthesizer;
a delay element; and
a waveform detector;
wherein the system comprises a first set of signal paths and a second set of signal paths,
the first set of signal paths comprising:
a reference signal path from the waveform synthesizer to the delay element to the waveform detector; and
a local channel signal path from the waveform synthesizer to the waveform detector via a local loudspeaker and a local microphone;
the second set of signal paths comprising:
a first signal path from a signal source to an acoustic echo canceller via the local loudspeaker and the local microphone; and
a second signal path from the signal source to the delay element to the acoustic echo canceller;
wherein the waveform detector comprises logic to detect a measure of time between receipt of a waveform generated by the waveform synthesizer via the reference signal path and receipt of the waveform generated by the waveform synthesizer via the local channel signal path;
wherein the delay element is configured based on the waveform detector's detecting the measure of time between receipt of a waveform from the waveform synthesizer via the reference signal path and receipt of the waveform from the waveform synthesizer via the local channel signal path; and
wherein the system selects the first set of signal paths to configure the delay element and wherein the system selects the second set of signal paths to process a telephony signal received from a remote site and a telephony signal being sent to the remote site.

2. The system of claim 1, wherein the waveform synthesizer, the delay element, and the waveform detector comprise software.

3. The system of claim 1, wherein the waveform detector to detect a measure of time between receipt of the waveform via the reference signal path and receipt of the waveform via the local channel signal path comprises logic to count a number of signal samples received after detecting receipt of the waveform from the waveform synthesizer.

* * * * *